US012438309B2

(12) United States Patent
Wu et al.

(10) Patent No.: US 12,438,309 B2
(45) Date of Patent: Oct. 7, 2025

(54) ELECTRICAL CONNECTOR WITH IMPROVED INSERTING MEMBER

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Xun Wu, Kunshan (CN); Ming-Yi Gong, Kunshan (CN); Tian Yang, Kunshan (CN); Hung-Chi Yu, New Taipei (TW); Wen-Lung Hsu, New Taipei (TW); Min-Hsuan Tsai, New Taipei (TW); Guo-Xiang Niu, Huaian (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 361 days.

(21) Appl. No.: 18/134,825

(22) Filed: Apr. 14, 2023

(65) Prior Publication Data

US 2023/0352880 A1 Nov. 2, 2023

(30) Foreign Application Priority Data

Apr. 28, 2022 (CN) ......................... 202210462659.3
Jun. 2, 2022 (CN) ......................... 202210624516.8

(51) Int. Cl.
*H01R 13/6471* (2011.01)
*H01R 13/03* (2006.01)
*H01R 13/6477* (2011.01)

(52) U.S. Cl.
CPC ......... *H01R 13/6471* (2013.01); *H01R 13/03* (2013.01); *H01R 13/6477* (2013.01)

(58) Field of Classification Search
CPC ........................... H01R 12/714; H01R 12/716; H01R 13/6471; H01R 13/6597; H01R 13/6599
(Continued)

(56) References Cited

U.S. PATENT DOCUMENTS 9,409,331 B2 * 8/2016 Liu ...................... H01R 13/504
2015/0188250 A1 * 7/2015 Liu ...................... H01R 13/504 439/86

(Continued)

*Primary Examiner* — Marcus E Harcum
(74) *Attorney, Agent, or Firm* — Ming Chieh Chang

(57) ABSTRACT

An electrical connector includes: an insulating housing defining a mating face, a card slot, and two side walls at opposite sides of the card slot, each of the side walls defining signal passageways and grounding passageways; two rows of terminals located on the side walls and each row of terminal including signal terminals in the signal passageways and grounding terminals in the grounding passageways, the terminals including retaining portions retained in the passageways and elastic arms with contacting portions extending into the card slot; and a one-piece inserting member assembled in the insulating housing, wherein the inserting member defines plural first inserting portions inserted in the signal passageways and plural second inserting portions inserted in the grounding passageways, the second inserting portions contact corresponding grounding terminals, respectively, to establish a grounding path.

20 Claims, 19 Drawing Sheets

(58) Field of Classification Search
USPC .................................... 439/86, 607.02, 941
See application file for complete search history.

(56) References Cited

U.S. PATENT DOCUMENTS

| | | | | |
|---|---|---|---|---|
| 2017/0170606 | A1 | 6/2017 | Phillips et al. | |
| 2020/0076135 | A1* | 3/2020 | Tang | H01R 12/721 |
| 2021/0036465 | A1* | 2/2021 | Tang | H01R 12/721 |
| 2021/0075143 | A1* | 3/2021 | Laurx | H01R 13/405 |
| 2021/0126402 | A1 | 4/2021 | Zhang et al. | |
| 2021/0328369 | A1* | 10/2021 | Wu | H01R 13/6477 |
| 2021/0336361 | A1* | 10/2021 | Shen | H01R 13/502 |
| 2021/0351529 | A1* | 11/2021 | Yang | H01R 13/6597 |
| 2022/0102916 | A1* | 3/2022 | Liu | H01R 43/20 |
| 2023/0132094 | A1* | 4/2023 | Liu | H01R 13/6597<br>439/607.31 |
| 2024/0413554 | A1* | 12/2024 | Qiu | H01R 13/6466 |

* cited by examiner

ELECTRICAL CONNECTOR WITH IMPROVED INSERTING MEMBER

BACKGROUND OF THE INVENTION

Field of the Invention

The present invention relates generally to an electrical connector with an improved inserting member to change dielectric constant around signal terminals.

Description of Related Arts

In card edge connectors, the terminals have a large size for assembling of the terminals including signal terminals and grounding terminals, resulting in decrease the dielectric constant around signal terminals. The signal terminals are long and thin, resulting in a large inductive impedance of the signal terminals. US20210126402A1 discloses an insulating inserting member to overcome these problems. But this is not enough in a higher speed connector, such as PCIE 6.0 connector.

An improved electrical connector is desired.

SUMMARY OF THE INVENTION

An object of the present invention is to provide an electrical connector with an improved inserting member.

To achieve the above-mentioned object, an electrical connector comprises: an insulating housing having a mating face, a card slot recessed from the mating face with a floor face facing the mating face, and two side walls located at opposite sides of the card slot, each of the side walls defining a plurality of signal passageways and a plurality of grounding passageways; two rows of terminals located on the side walls and each row of terminal comprising a plurality of signal terminals in the signal passageways and a plurality of grounding terminals in the grounding passageways, each of the two rows of terminals comprising a retaining portion retained in the passageway and an elastic arm with a contacting portion extending into the card slot; and a one-piece inserting member assembled in the insulating housing, wherein the inserting member defines a plurality of first inserting portions inserted in the signal passageways and a plurality of second inserting portions inserted in the grounding passageways, and the second inserting portions contact corresponding grounding terminals, respectively, to establish a grounding path.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1:
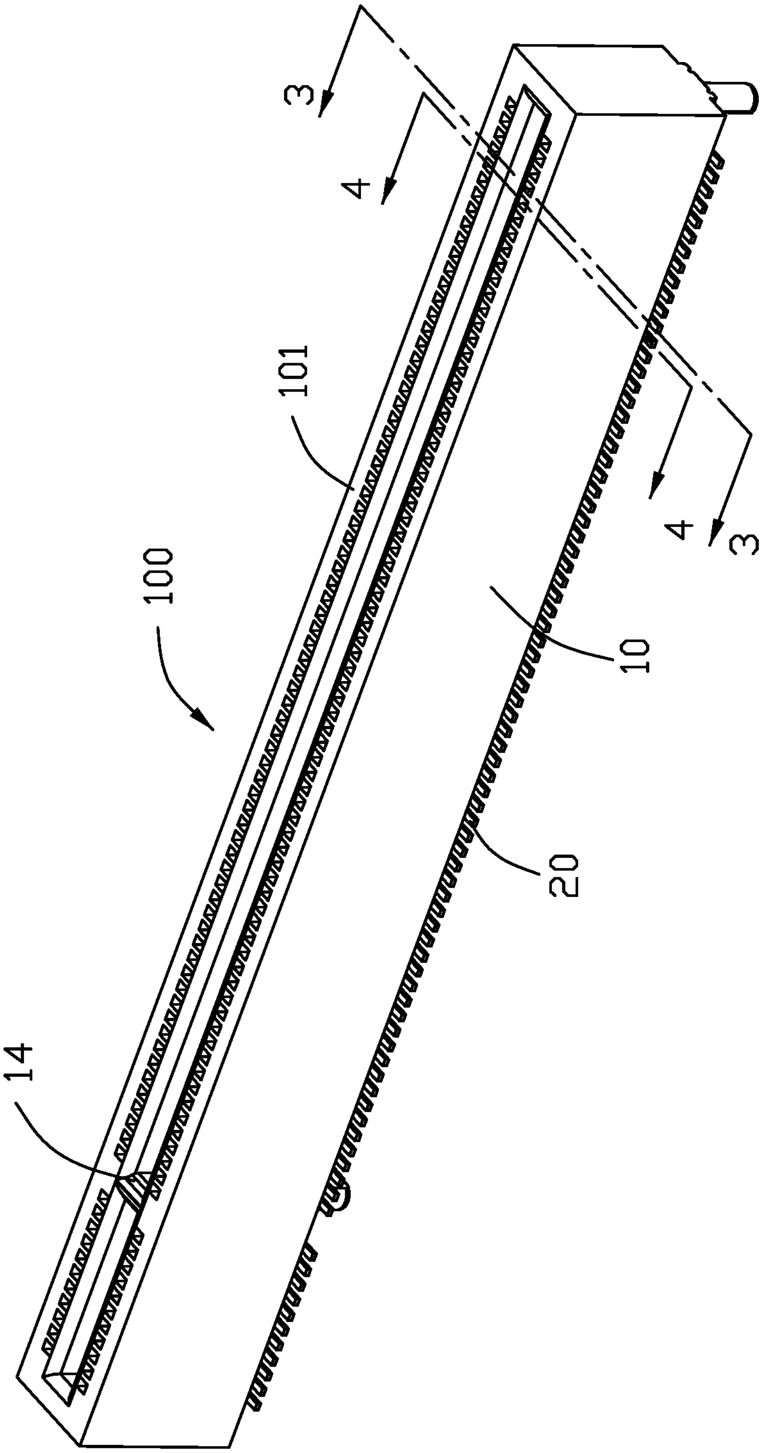
FIG. 1 is a perspective view of an electrical connector according to a first embodiment of the present invention.

Reference will now be made to the drawing figures to describe the preferred embodiment of the present invention in detail.

An electrical connector 100 of this present invention is a type of card edge connector for PCIe 6.0 signal transmission, which is inserted with a PCIe card and the likes. Referring to FIGS. 1-4, the electrical connector 100 includes an insulating housing 10, a plurality of terminals 20 and an inserting/filling member 30. The insulating housing 10 defines a mating face 101, a card slot 11 recessed from the mating face 101 with a floor face 102 and two opposite inner faces 103 connecting with the floor face 102. In this embodiment, a top face of the housing 10 is defined as the mating face 101. The card is inserted in the card slot 11 through the mating face 101. The housing 10 includes two side walls 12 located at opposite sides of the card slot 11, each side wall defines a row of passageways 13 to receive the terminals 20, the passageways 13 run downwards through a bottom face of the housing and inwards through the inner face 103. In this embodiment, the passageways 13 run upwards through the mating face 101

Figure 4:
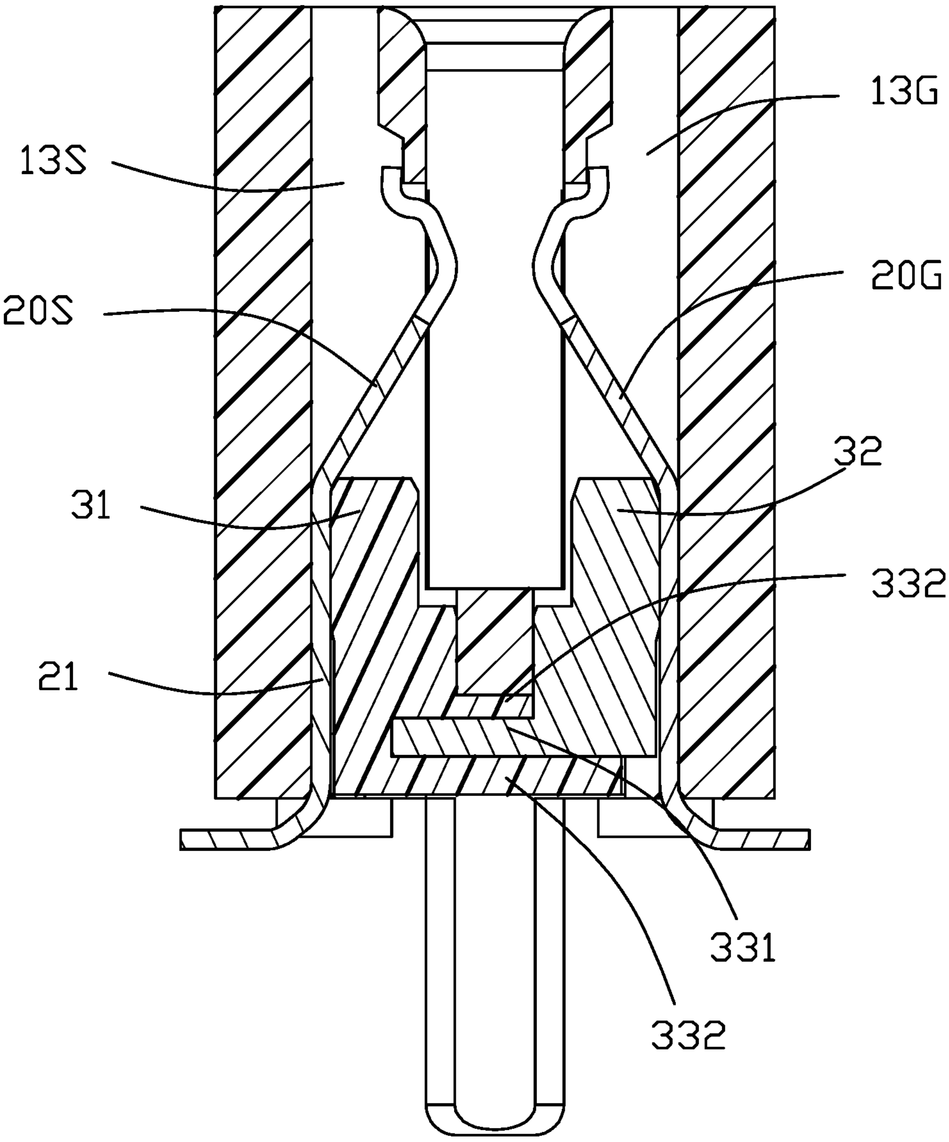
FIG. 4 is a cross-section of the electrical connector taken alone lines 4-4 in FIG. 1.
Figure 5:
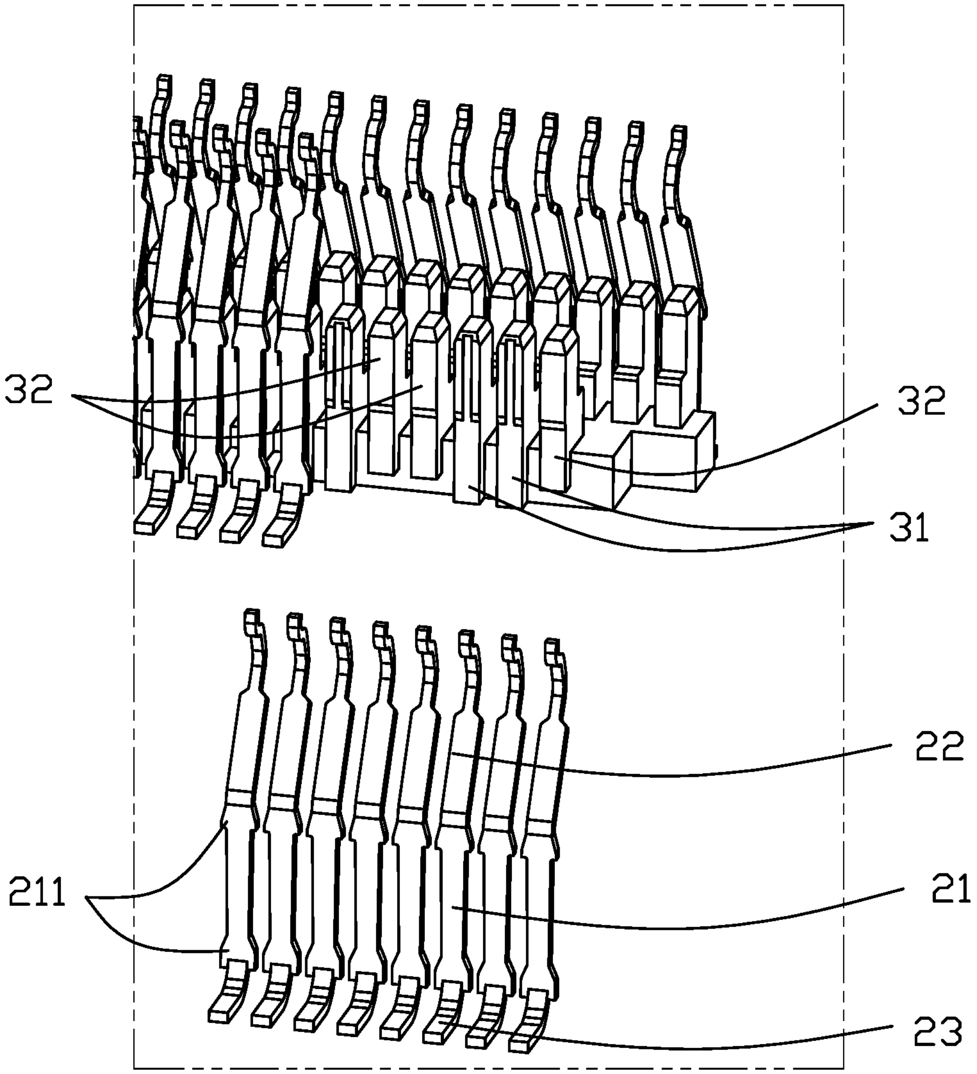
FIG. 5 is a partly exploded perspective view of an inserting member and two rows of terminals in part in FIG. 1.
Figure 6:
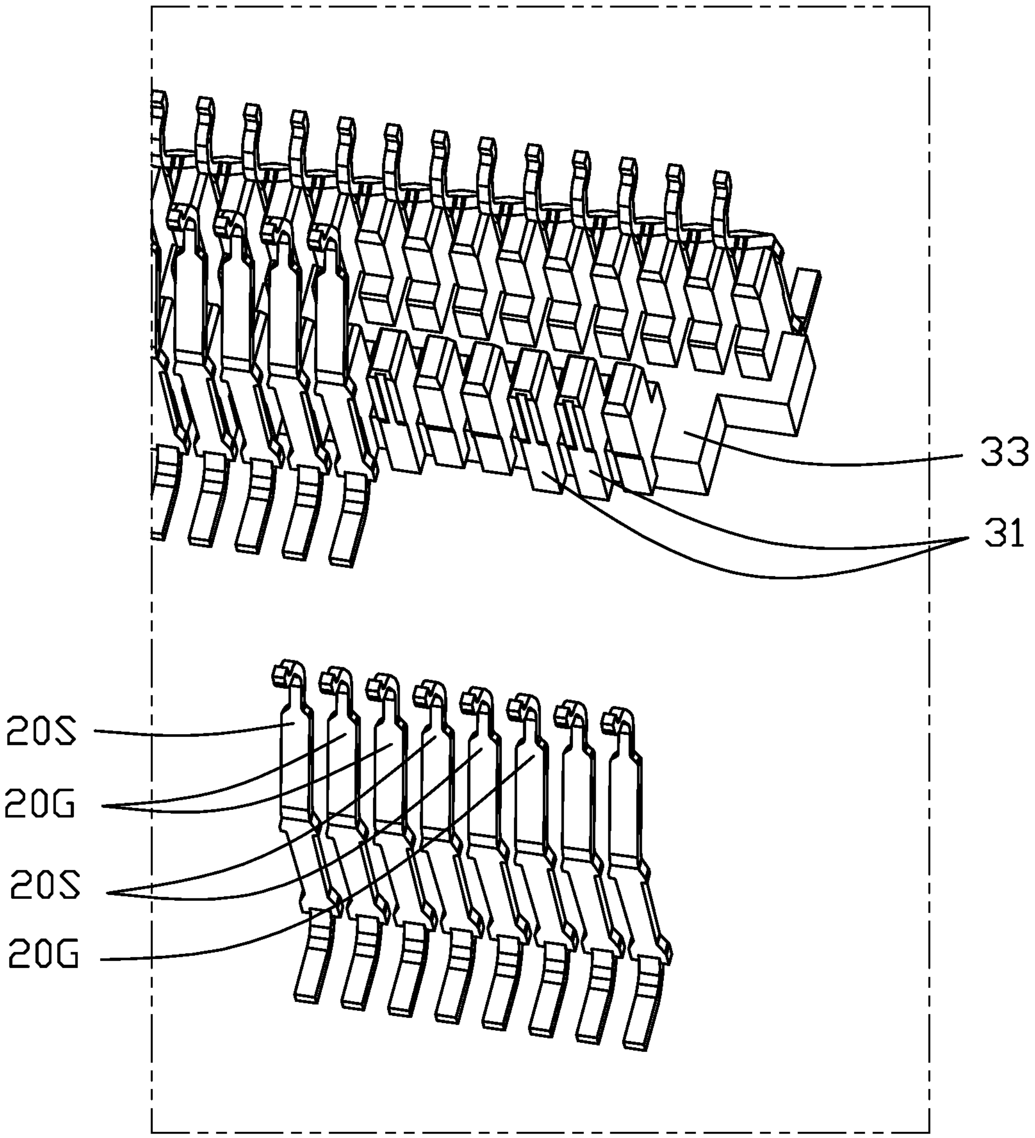
FIG. 6 is another view of the inserting member and two rows of terminals in FIG. 5.

Referring to FIGS. 5-6, the terminals 20 include retaining portions 21, elastic arms 22 and leg portions 23. Combination with FIGS. 3-4, the retaining portions 21 are retained in corresponding passageways 13, the elastic arms 22 go across the passageways 13 and protrude into the card slot 11. The elastic portions 22 define contacting portions 221 thereon to mechanically connect with conductive pads of the card. In this embodiment, the retaining portions 21 are of an upright construct and constructed with two cutting faces, each cutting face defines barbs 211. After the terminals 20 are assembled upward from the bottom face of the housing into the passageways 13, two opposite metal faces/larger faces of the retaining portions 21 confront with two large inner faces of the passageways 13, the two opposites cutting faces of the retaining portions are confronting with two another small inner faces of the passageways 13 and the bars 211 are interfering with the two another inner faces of the passageways. The elastic arms 22 go through the passageways 13 and into the card slot 11. The passageways 13 have a larger dimension in a transverse direction perpendicular to the side walls 12 so that the elastic arms 22 with arc-shape contacting portion 221 can go through the passageways 13. The distal free ends of the elastic arms 22 bend towards the mating face 101 to form a pro-loading portion 222, the pro-loading portions 222 press against the passageways 13 near to the mating face 101. In this embodiment, referring to FIG. 1, the card slot 11 is divided with two parts by a key 14, a left part is loaded with power terminals for power current transmission, a right part is located with a plurality of pairs of signal terminals 20S for signal transmission and two grounding terminals 20G as shown in FIG. 6, two adjacent signal terminals 20S is construed as a differential terminal pair.

Figure 2:
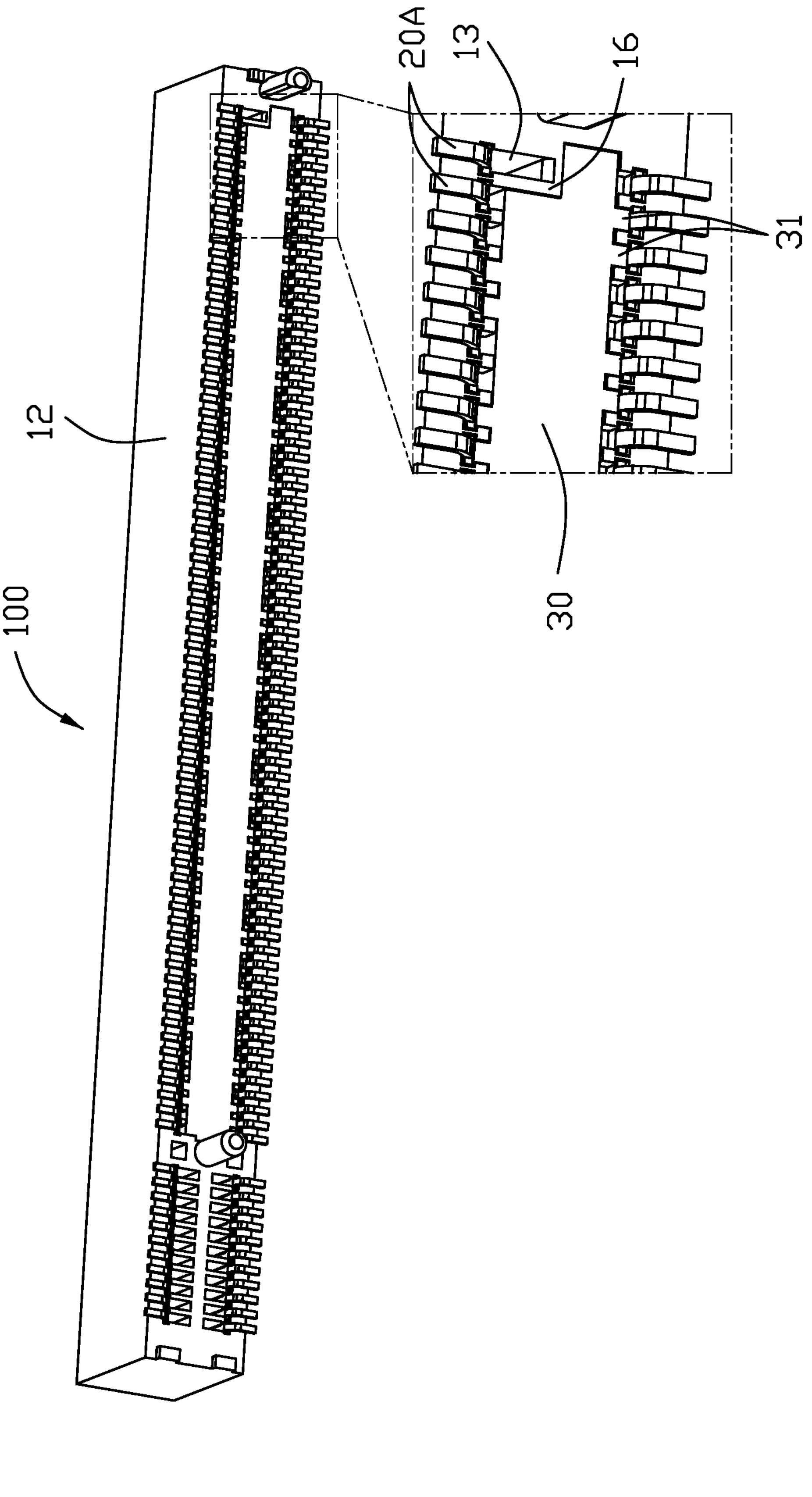
FIG. 2 is a partly exploded view of the electrical connector in FIG. 1.

Some passageways 13 in the left part are used to receive the signal terminals 20S, that are signal passageways 13S, some passageways 13 are to receive the grounding terminals 20G, that are grounding passageways 13G. The inserting member 30 is a one-piece construct and is mounted into the housing 10. The inserting member 30 includes two rows of inserting portions, that is, a plurality of insulating inserting portions 31 inserted and filled in corresponding signal passageways 13S and a plurality of conductive inserting portions 32 inserted and filled in corresponding grounding passageways 13G. The conductive inserting portions 32 contact with corresponding grounding terminals 20G to get grounding paths. The insulating inserting portions 31 are filled in the signal passageways 13S, thereby lowering dielectric constant of the material around the signal terminals 20S and adjusting impedance of the signal terminals. The conductive inserting portions 32 in the grounding passageways 13G bring a small change of the dielectric constant of the material around the grounding terminals. The conductive inserting portions 32 are united together and electrically connecting all the grounding terminals 20G together, thereby shorting electric length of grounding paths and shifting the resonance to a higher range. As shown in FIG. 2, the two terminals 20A are spared for specific or customized functions, the passageways received the terminals 20A are without the inserting portions. A anti-mismating construct 16 of an L-shape is formed beside the passageways for the two spared terminals 20A.

The inserting portions 31, 32 extend toward the mating face 101 and are close to the mating face 101 than the floor face 102 of the card slot 11, so as to change the dielectric constant as large as possible. As shown in FIGS. 3-7, the inserting portions 31, 32 are located below the elastic arms 22, the top ends of the insulating inserting portions 31 and the conductive inserting portion 32 are flushed with the joints between the retaining portion 21 and the elastic arms 22. The inserting portions press against the upright retaining portion 21 and bring no influence to the elastic arms 22. The conductive inserting portions 32 extend downward and are substantially flushed with the bottom face of the housing 10. In this embodiment, the conductive inserting portions 32 and the insulating inserting portions 31 are substantially flushed with each other.

Figure 7:
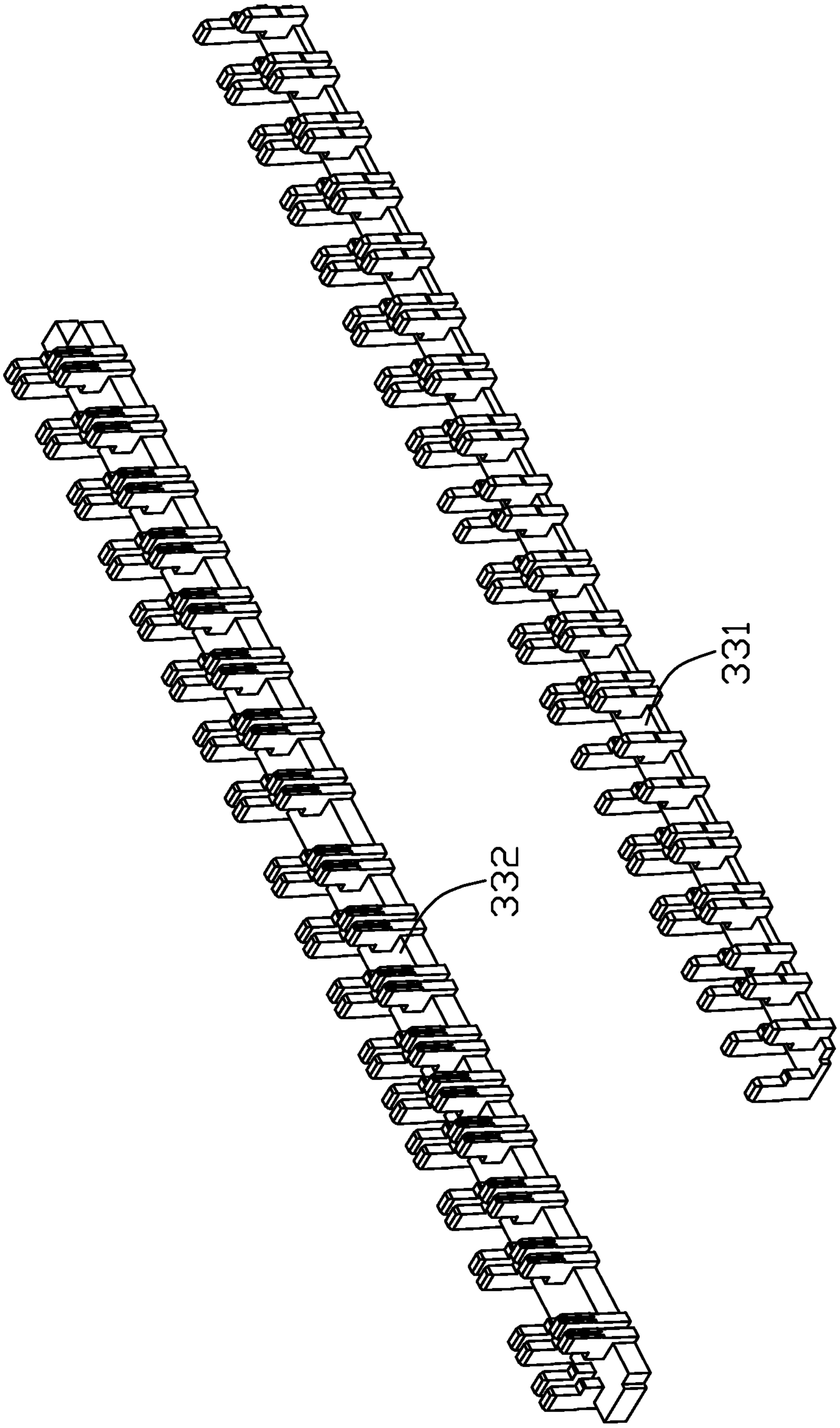
FIG. 7 is an exploded perspective view of the inserting member.
Figure 8:
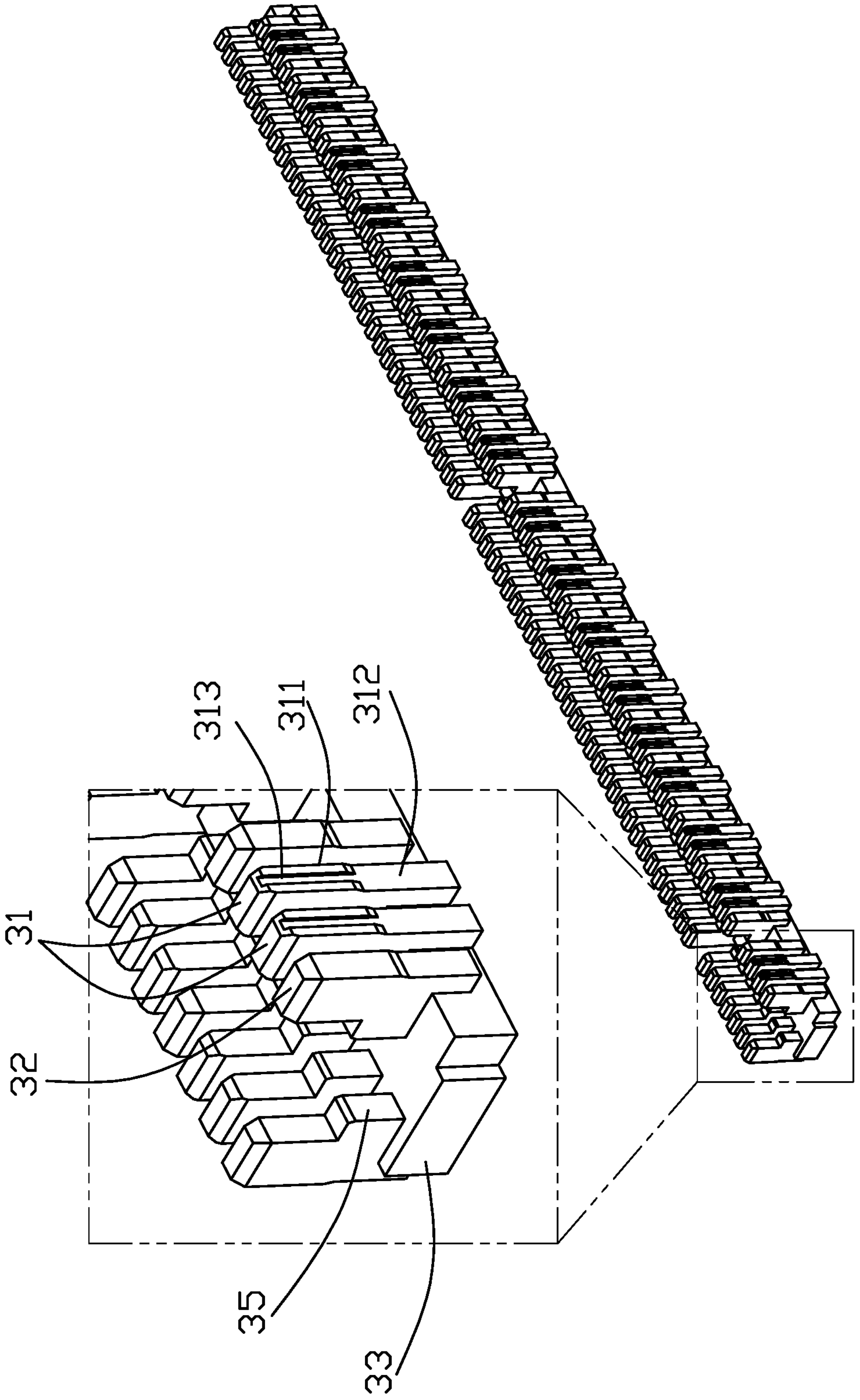
FIG. 8 is a perspective view of the inserting member.

Referring to FIGS. 7-8, the inserting member 30 in this embodiment includes a bottom base 33 and the inserting portions 31, 32 unitarily and upright extending from the bottom base 33. The bottom base 33 consists of conductive layers 331 and insulating layers 332 united together. The insulating layer 332 surrounds upper and lower surfaces of the conductive layer 331, the conductive inserting portions 32 each in a post shape extend upwards from the conductive layer 331, while the insulating layers 331 extend upwards from the insulating layer 332. In this embodiment, the conductive inserting portions 32 are made from conductive plastic, the conductive inserting portions 32 are formed by a first inserted mold process, and the insulating layer 332 and the insulating inserting portions 31 are formed around the upper and lower surfaces of the conductive layers 331 by a second inserting mold process. Therefore, the inserting/filled member 30 is formed. As shown in FIG. 8, the insulating layers 332 surround a periphery of the conductive layer 331, the inserting portions 31, 32 are arranged in a row. The bottom face of the inserting member 30 is insulating, avoiding from shorting with conductive pads or elements on the printed circuit board. Combination with FIGS. 3-4, the inserting portions 31/32 in this embodiment are of a cuboid post, two rows of the cuboid posts are arranged along the transverse direction thereof, each row of the cuboid posts are arranged along a longitudinal direction. In this embodiment, the upper portions of the cuboid posts proximate to the floor face 102 press against the retaining portions 21 of the terminals, the upper portions far away from the floor face 101 separate from the terminals with a gap. The interfering force between the cuboid posts and the insulating housing 10 increase a retaining force between the inserting member 30 and the housing 10. The bottom face of the insulating inserting portions 31 is lower than the conductive inserting portions 32, while the bottom faces of the insulating inserting portions 31 are substantially flushed with the bottom face of the bottom base 33.

More specifically, the insulating inserting portion 31 defines an outer face facing corresponding signal terminal 20S, the outer face is divided to an upper outer face 311 and a lower outer face 312. The upper face 311 further defines a upright groove 313 recessed therefrom and extending through along an upright direction. Combination with FIG. 3, the upper outer face 311 and the signal terminal 20S are interfered with each other, while the lower outer face 312 and the signal terminal 20S are separated with a gap 315. Similarly, the conductive inserting portion 32 defines an outer face facing corresponding grounding terminal and is divided to an upper outer face contacting corresponding grounding terminal and a lower outer face separated from the grounding terminal.

That is, at least one side wall 12 defines at least one signal passageway accommodating the signal terminal and at least one grounding passageway accommodating the grounding terminal. The inserting/filling member 30 is of one-piece construct and includes an insulating inserting portion accommodating the signal passageway and a conductive inserting portion accommodating the grounding passageway and contacting the grounding terminal.

Figure 3:
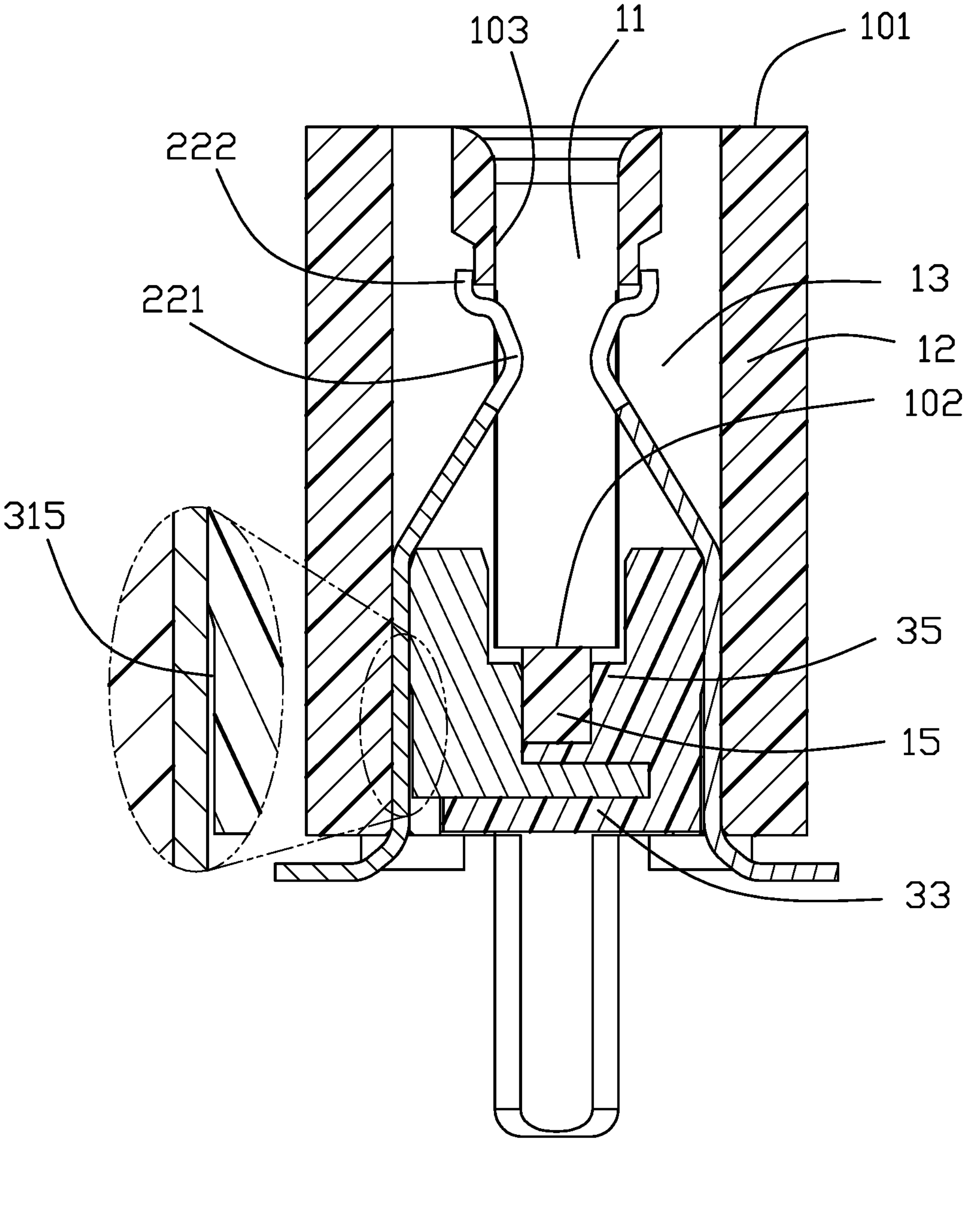
FIG. 3 is a cross-section of the electrical connector taken alone lines 3-3 in FIG. 1.

In this embodiment as shown in FIG. 3, the passageways 13 open downward through the bottom face of the insulating housing 10. Two opposite passageways 13 in the transverse direction extend toward each other and separate by a partitioning wall 15. A cavity is defined below the partitioning wall 15 and between two outer sides of the passageways 13, for receiving the board base 33 of the inserting member 30 after the inserting member 30 is assembled in the housing 10 from the bottom face of the housing. A convex portion 35 is defined on an inner side of the inserting portion 31/32, the convex portions 35 are located below the floor face 102 as shown in FIGS. 3-4, and the adjacent inserting portions 35 sandwich the partitioning wall 15.

Alternative embodiments with varied inserting members are described hereinafter. The insulating housing and the terminals are similar to the first embodiment in FIGS. 1-8. The same numerals are used in varied embodiment.

Figure 9:
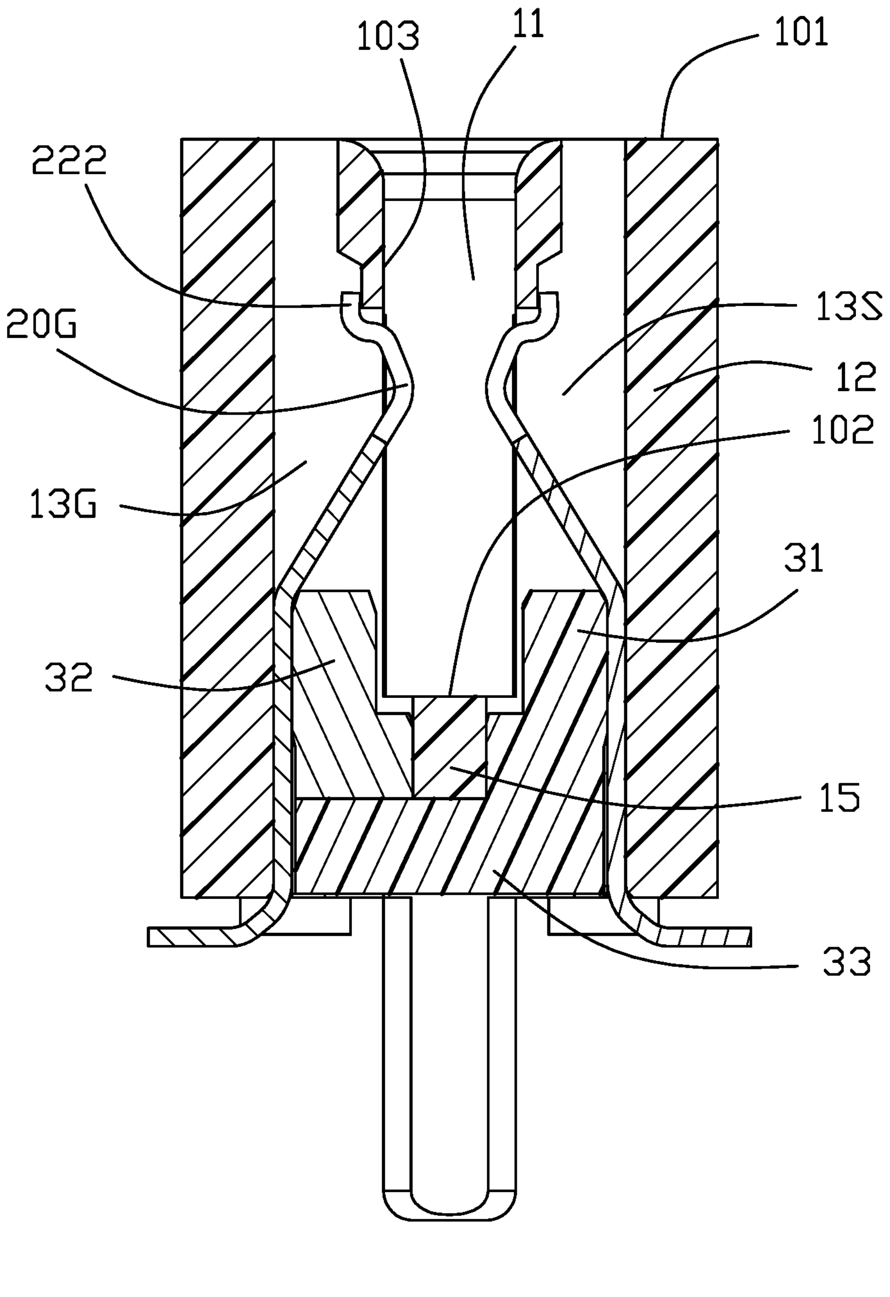
FIG. 9 is a cross-section of an electrical connector of a second embodiment of this present invention, which is similar to FIG. 4.

Referring to FIG. 9 illustrating a second embodiment of the inserting member 30, the bottom base 33 of the inserting member is made from insulating plastic, the conductive inserting portions 32 extend from an upper face of the insulating plastic. During a manufacture process of the inserting member 30, the insulating plastic including bottom base 33 and the insulating inserting portions 31 is made firstly, and then the conductive inserting portions 32 are formed on the bottom base 33.

Figure 10:
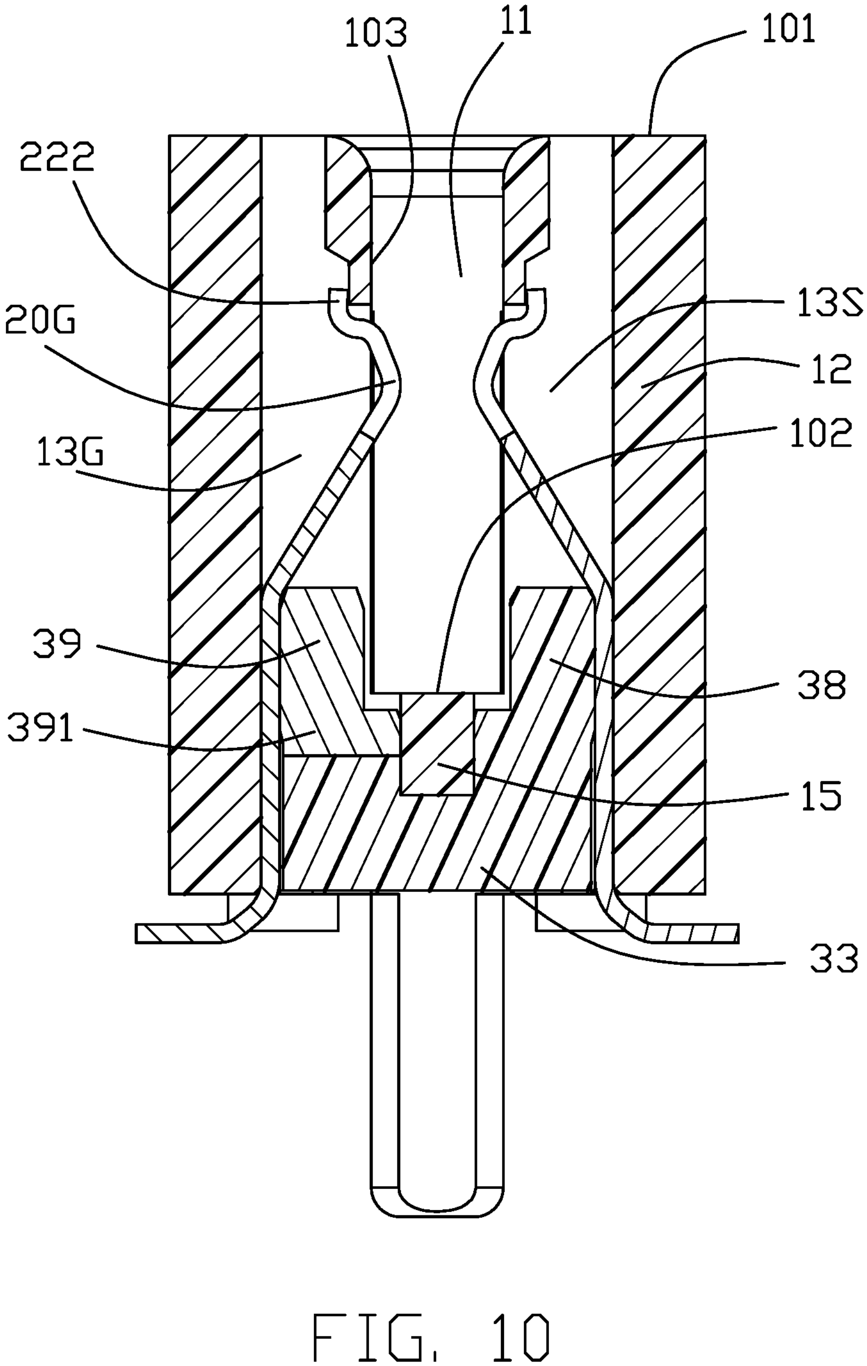
FIG. 10 is a cross-section of an electrical connector of a third embodiment of this present invention, which is similar to FIG. 4.
Figure 11:
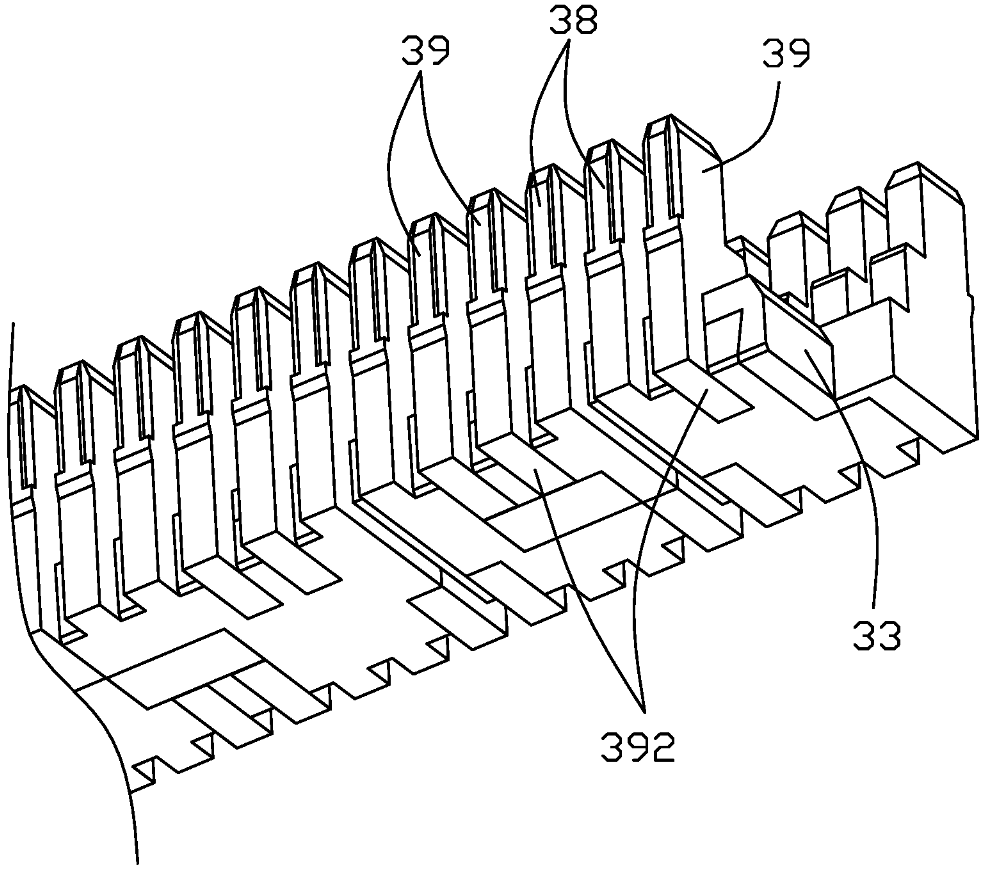
FIG. 11 is a perspective view of the inserting member in part of a fourth embodiment of this present invention.
Figure 12:
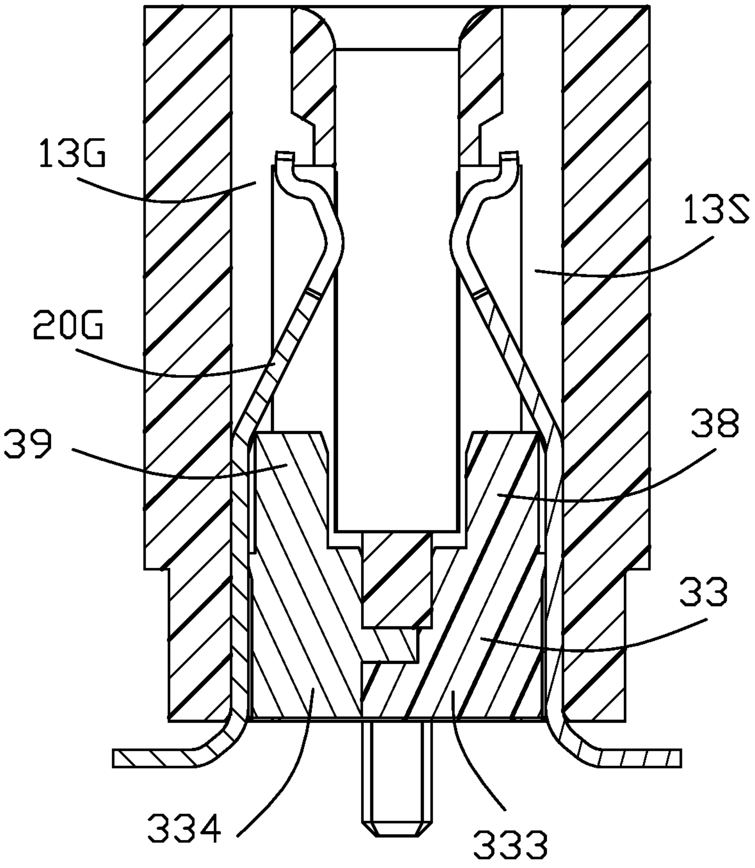
FIG. 12 is a cross-section of the electrical connector of the fourth, which is similar to FIG. 4.
Figure 13:
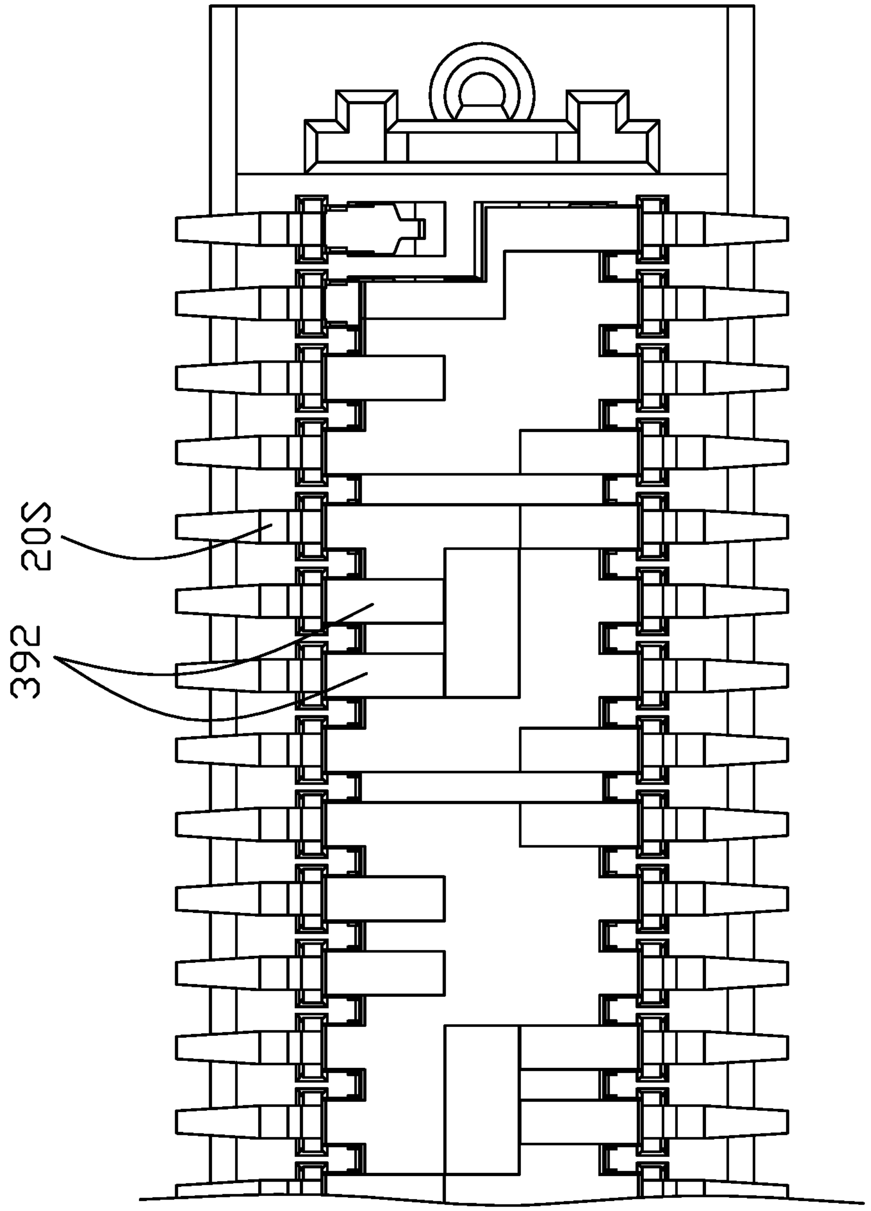
FIG. 13 is a bottom elevational view of the electrical connector of the fourth embodiment, which is similar to FIG. 4.

Referring to FIG. 10 illustrating a third embodiment of the inserting member 30, the bottom base 33 of the inserting member is made from insulating plastic, and the insulating plastic extends until below the conductive plastic 391, that means, the inserting portions in the grounding passageways 13G includes an lower insulating plastic and an upper conductive plastic, the conductive plastic 391 press against the inner face of the grounding terminals 20G. That is, the inserting member includes a bottom base 33 and a plurality of first inserting portion 38 and a plurality of second inserting portions 39 extending from the bottom base 33, the first inserting portions 38 are inserted into the signal passageways 13S and made from insulating plastic, while the second inserting portions 39 are inserted in the grounding passageways 13G and at least part is made from conductive plastic 391. The conductive plastic 391 extend downwards to connect with the bottom base 33, so that the conductive plastics 391 of the row of the second inserting portions 39 are electrically connecting together, thereby getting a grounding path.

Figure 14:
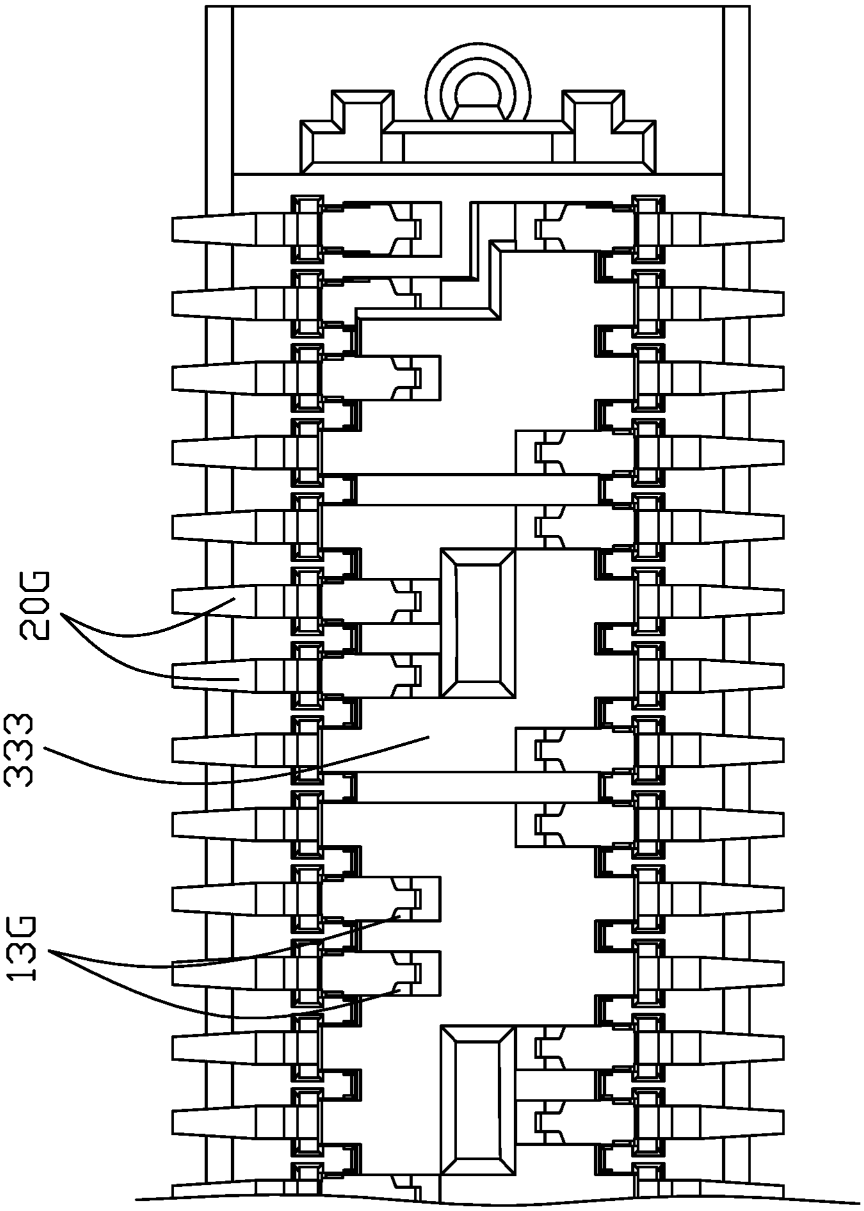
FIG. 14 is similar to FIG. 13, but the conductive plastic is deleted.
Figure 15:
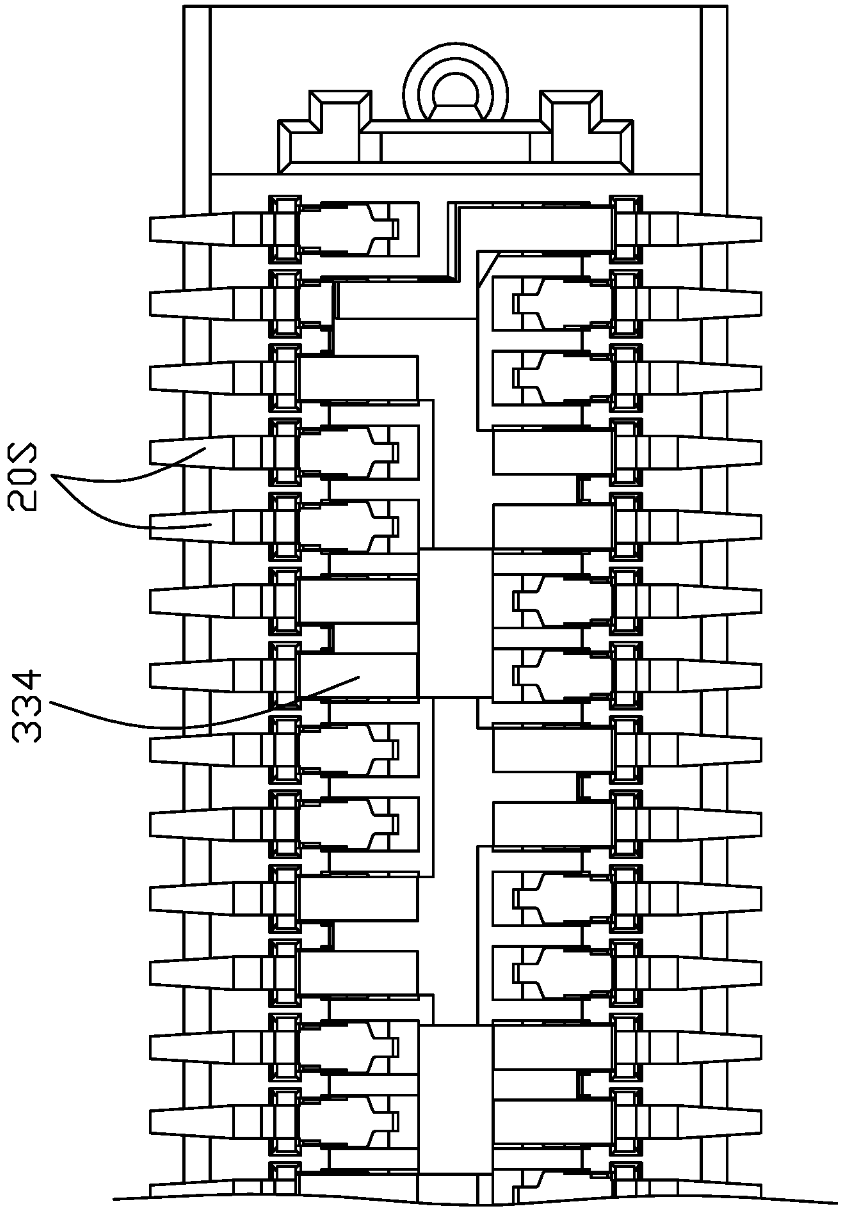
FIG. 15 is similar to FIG. 13, but the insulating plastic is deleted.

Referring to FIGS. 11-15 illustrating a fourth embodiment of the inserting member 30, the second inserting portions 39 used to insert into the ground passageways 13G are made from conductive plastic 334 and the conductive plastic 334 extends downward to the bottom face of the bottom base 33 so that the second inserting portions 39 are electrically connecting together by the conductive layers. The first inserting portions 38 are filled in the signal passageways 13S. Shown in FIGS. 13-15 viewing the bottom face of the housing 10, the bottom face of the housing is exposed with insulating plastic 333 and conductive plastic 334. In FIG. 14 deleting the conductive plastic 334, the first inserting portions 38 are filled in the signal passageways 13S, the insulating plastic 333 of the bottom base 33 are not aligned with the grounding passageways 13G, that means, there is no insulating plastic 333 in the extend of the grounding passageways 13G in a lower to upper direction. In FIG. 15 deleting the insulating plastic 333, the second inserting portions 39 are filled in the grounding passageways 13G, there is no conductive plastic 334 in the extend of the signal passageways 13S in the lower to upper direction. There's no insulating portions including the insulating inserting posts and part of the bottom base in the extend of the grounding passageways, not conductive portions including the conductive inserting posts and another part of the bottom base. In wholly, the conductive plastic material is increase. Therefore, the conductive plastic is formed firstly and then the insulating plastic is formed on the conductive plastic. Alternatively, an insulating film is attached on the bottom face of the inserting member 30 to avoid a circuit shorting of the conductive plastic and the conductive elements of the PCB.

Figure 16:
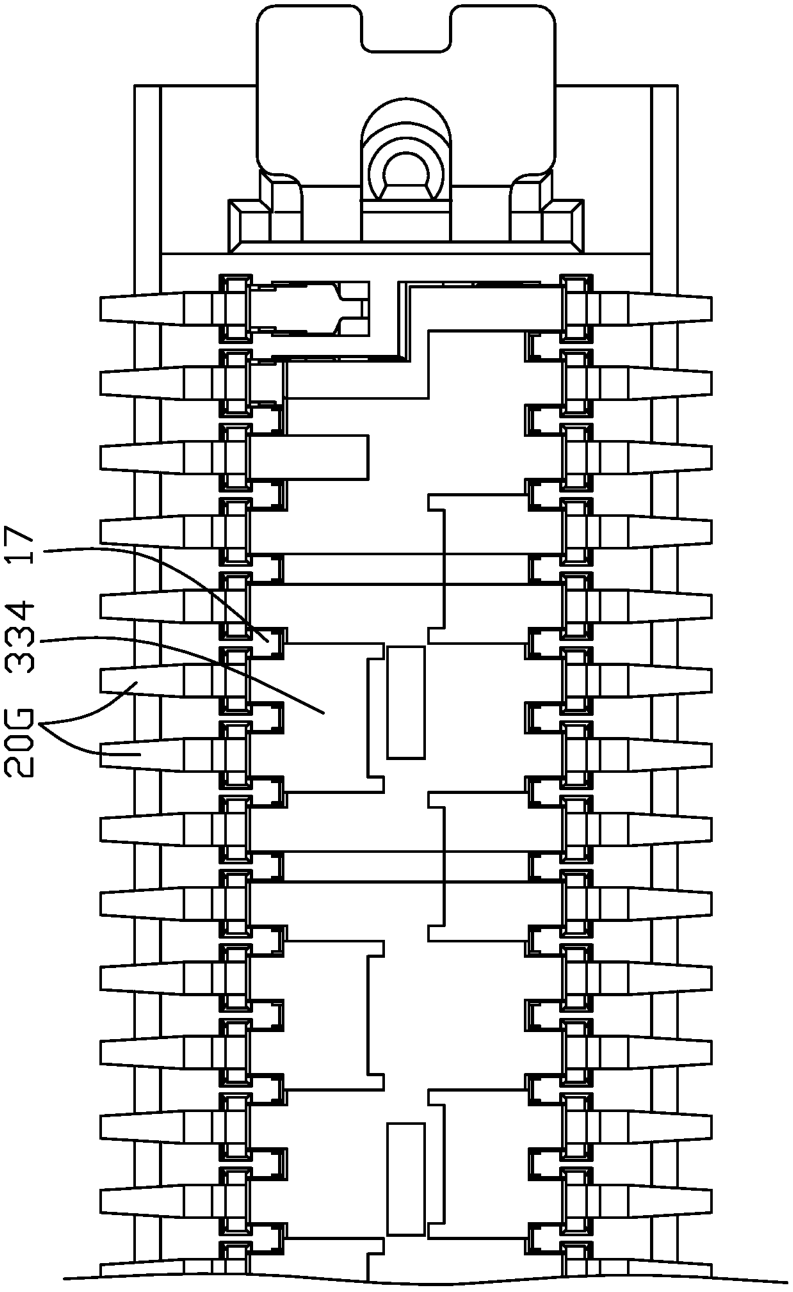
FIG. 16 is a bottom elevational view of an electrical connector of a fifth embodiment, which is similar to FIG. 13.
Figure 17:
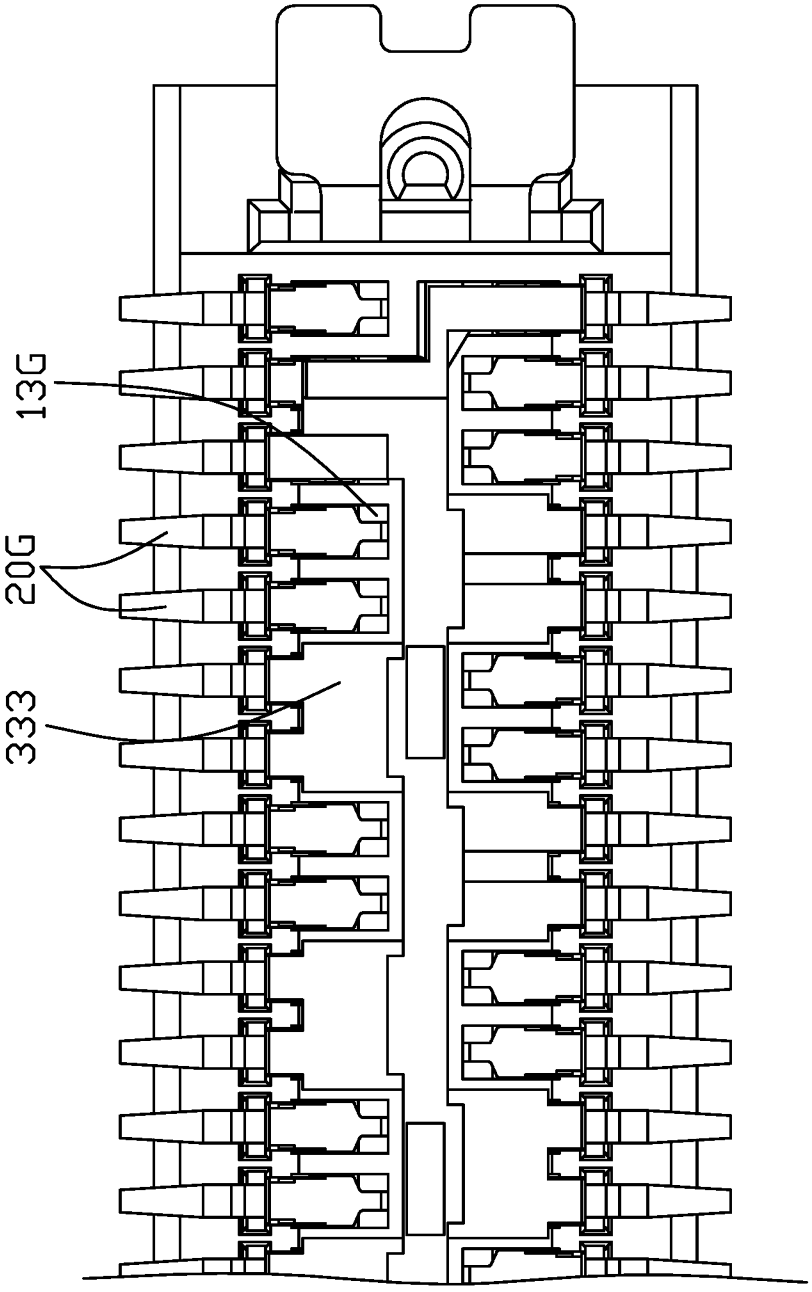
FIG. 17 is similar to FIG. 16, but the conductive plastic is deleted.

Referring to FIGS. 16-17 illustrating a fifth embodiment of the improved inserting member 30 on a basis of the inserting member of the fourth embodiment, the conductive plastic 334 extends in the transverse direction until the partitioning walls 17. That means, the conductive plastic is increase while the insulating plastic is decrease, the insulating plastic 333 is located far away from the grounding passageways 13G.

Figure 18:
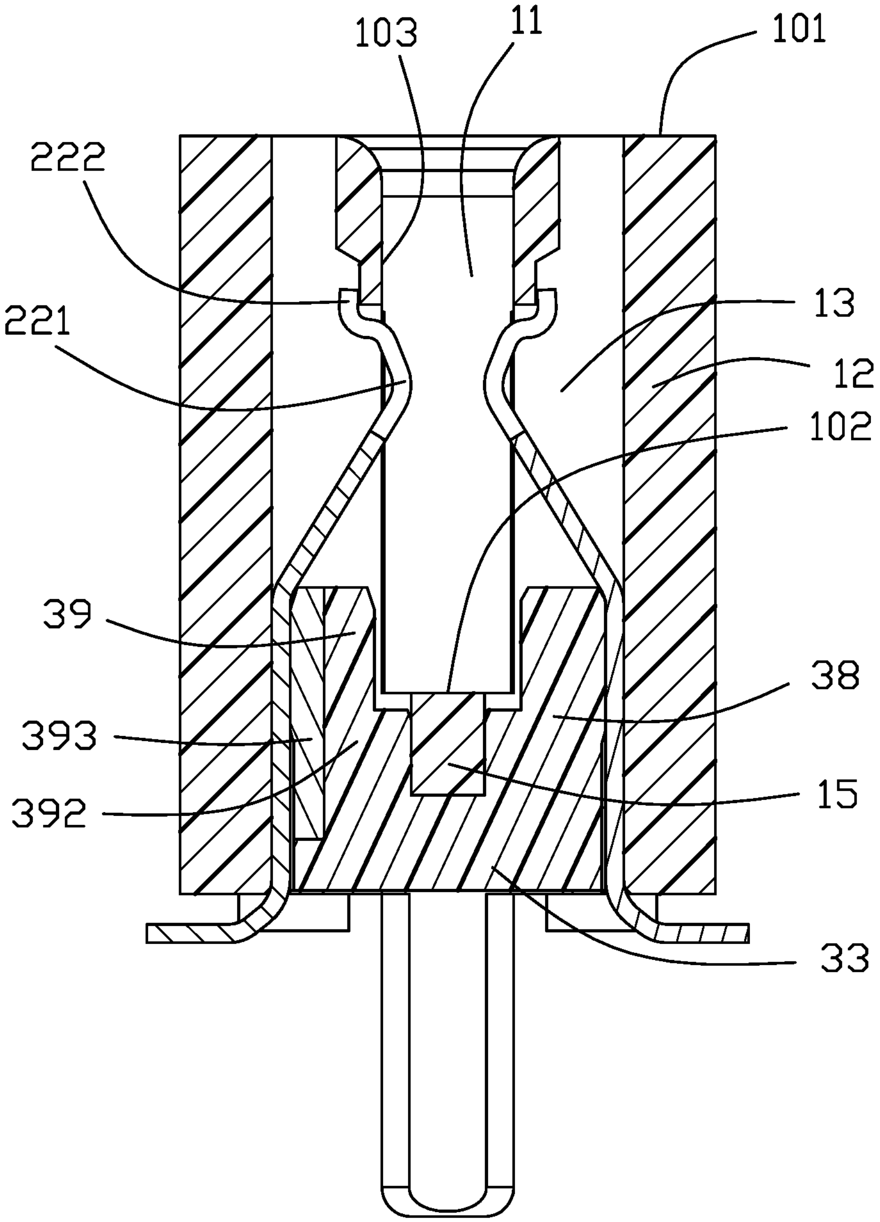
FIG. 18 is a cross-section of the electrical connector of a sixth embodiment, which is similar to FIG. 4.

Referring to FIG. 18 illustrating a sixth embodiment of the inserting member, most of the second inserting portions 39 accommodating in the grounding passageways 13G are made from insulating plastic 392 extending from the bottom base 33 until a top end of the second inserting portions 39. A conductive plastic 393 are filled in the insulating plastic 392, and exposes to the outer face of the second inserting portions facing the grounding terminals. Therefore, the conductive plastic electrically connects with the grounding terminals 20G to get a grounding path. The conductive plastic 33 can extend downward proximate to but not reach the bottom face of the bottom base 33, so that the adjacent conductive plastic 393 are united together. The top ends of the first and the second inserting portions are flushed and higher than the floor face 102 of the card slot 11.

Figure 19:
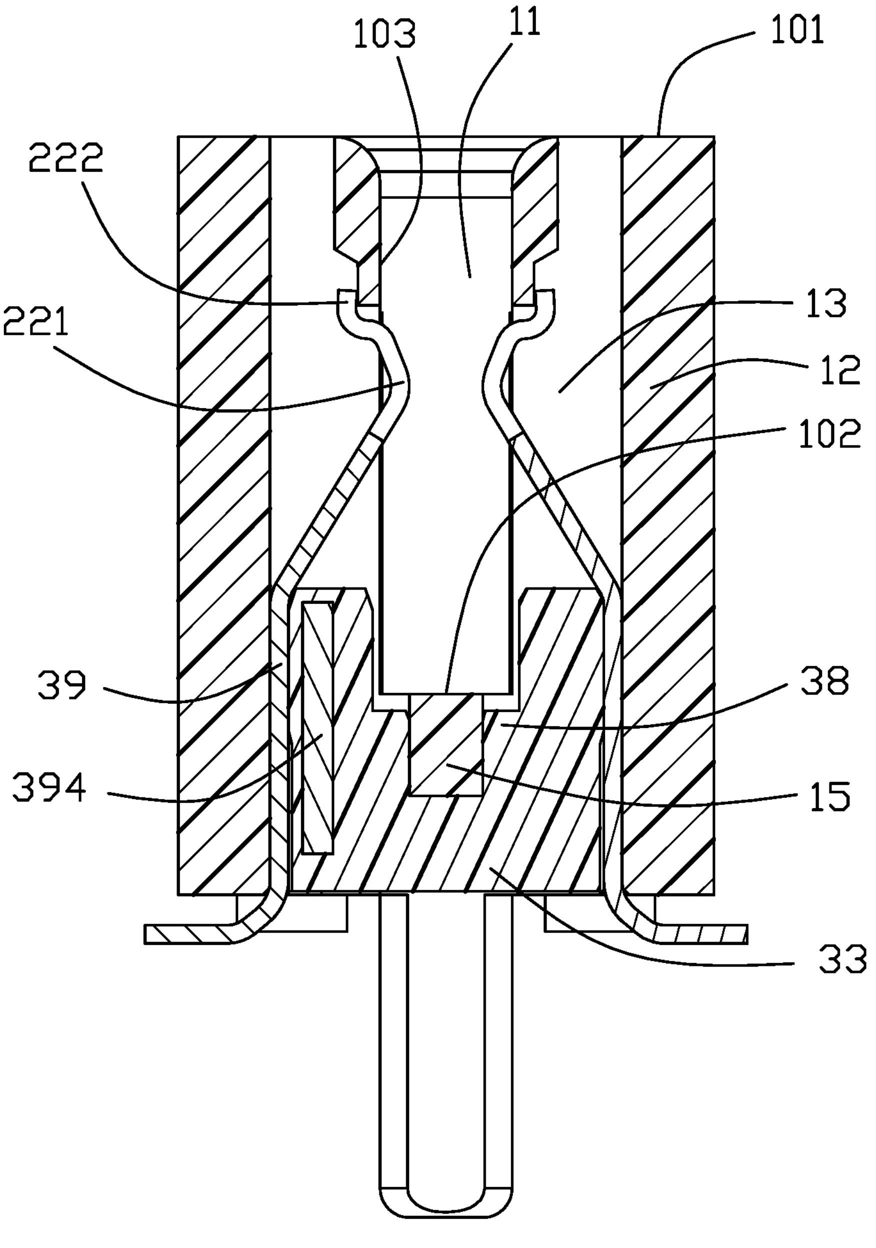
FIG. 19 is a cross-section of the electrical connector of a seventh embodiment, which is similar to FIG. 4.

Referring to FIG. 19 illustrating a seven embodiment of the inserting member, a conductive plastic 394 is embedded in the second inserting portion 39, a tab of the grounding terminal or other conductive element contacts the conductive plastic 394 to get a grounding path.

The above-mentioned embodiments are only preferred embodiments of the present invention, and should not limit the scope of the present invention, any simple equivalent changes and modifications made according to the claims of the present invention and the contents of the description should still belong to the present invention.

The invention claimed is:

1. An electrical connector comprising:

an insulating housing having a mating face, a card slot recessed from the mating face with a floor face facing the mating face, and two side walls located at opposite sides of the card slot, each of the side walls defining a plurality of signal passageways and a plurality of grounding passageways;

two rows of terminals located on the side walls and each row of terminal comprising a plurality of signal terminals in the signal passageways and a plurality of grounding terminals in the grounding passageways, each of the two rows of terminals comprising a retaining portion retained in the passageway and an elastic arm with a contacting portion extending into the card slot; and a one-piece inserting member assembled in the insulating housing;

wherein the inserting member defines a plurality of first inserting portions inserted in the signal passageways and a plurality of second inserting portions inserted in the grounding passageways, and the second inserting portions contact corresponding grounding terminals, respectively, to establish a grounding path.

2. The electrical connector as claimed in claim 1, wherein the first inserting portions are made from insulating plastic and at least part of the second inserting portions are made from conductive plastic.

3. The electrical connector as claimed in claim 2, wherein the inserting member comprises a bottom base, the first inserting portions and the second inserting portions extend from the bottom base, and the conductive plastics in adjacent second inserting portions are electrically united via the bottom base.

4. The electrical connector as claimed in claim 3, wherein the first inserting portions are made from insulating plastic, the second inserting portions are made from conductive plastic wholly, and the conductive plastic extend downwards to a bottom face of the bottom base.

5. The electrical connector as claimed in claim 4, wherein two adjacent passageways in a transverse direction perpendicular to the side walls are separated with a partitioning wall, and the conductive plastic extends in the transverse direction up to below the partitioning wall.

6. The electrical connector as claimed in claim 1, wherein the first inserting portions are made from insulating plastic and the second inserting portions are made from conductive plastic wholly, the second inserting portions and a conductive layer are formed by a first insert molding process and the second inserting portions and an insulating layer are formed by a second insert molding process, the conductive layer and the insulating layer are constructed of a bottom base, and the first inserting portions and the second inserting portions extend from the bottom base.

7. The electrical connector as claimed in claim 1, wherein an upper portion of the first inserting portion presses against corresponding signal terminal, and a lower portion of the first inserting portion is separated from a corresponding signal terminal.

8. The electrical connector as claimed in claim 7, wherein the upper portion of the first inserting portion defines an upright groove at an outer face thereof.

9. The electrical connector as claimed in claim 1, wherein the first inserting portions are made from insulating plastic, the second inserting portions are made from insulating plastic and embedded with conductive plastic, and the conductive plastics are exposed to an outer face thereof and press against corresponding grounding terminals.

10. The electrical connector as claimed in claim 9, wherein a lower end of the conductive plastic is lower than the floor face of the card slot but higher than the bottom face of the bottom base.

11. The electrical connector as claimed in claim 9, wherein the insulating plastic of the second inserting portions and the first inserting portions are flush with each other at top ends thereof and higher than the floor face of the card slot.

12. The electrical connector as claimed in claim 9, wherein the insulating housing defines a cavity at a bottom face thereof to receive the bottom base of the inserting member, and an anti-mating construct is defined in the cavity.

13. An electrical connector comprising:

an insulating housing comprising two opposite side walls and a card slot with a floor face between the two side walls, each of the side walls defining signal passageways and grounding passageways;

a row of terminals located on each side wall and comprising signal terminals accommodated in the signal passageways and grounding terminals accommodated in the grounding passageways, the terminals comprising retaining portions retained in the passageways and elastic arms across corresponding passageways; and an inserting member assembled in the insulating housing and defining a plurality of insulating portions and a plurality of conductive portions;

wherein the signal passageways are filled with corresponding insulating portions of the inserting member, the grounding passageways are filled with corresponding conductive portions of the inserting member without any insulating portions in a mating direction of the electrical connector, and the conductive portions contact corresponding grounding terminals.

14. The electrical connector as claimed in claim 13, wherein the inserting member comprises a bottom base and a plurality of insulating posts and a plurality of conductive post extending from the bottom base in the mating direction, the bottom base comprises insulating layers and conductive layers united together, the insulating posts extend from the insulating layers and commonly construct the insulating portions, and the conductive posts extend from the conductive layers and commonly construct the conductive portions.

15. The electrical connector as claimed in claim 13, wherein all of the conductive portions of the inserting member are united and electrically connect with each other.

16. The electrical connector as claimed in claim 13, wherein the insulating post defines an upper outer face and a lower outer face, the upper outer face of the insulating post presses against corresponding signal terminal, and the lower outer face of the insulating post is separated from a corresponding signal terminal.

17. An electrical connector comprising:

an insulating housing comprising two opposite side walls and a card slot with a floor face between the two side walls, at least one of the side walls defining signal passageways and grounding passageways;

a row of terminals comprising signal terminals in the signal passageways and grounding terminals in the grounding passageways; and an inserting member defining a plurality of first inserting portions in corresponding signal passageways and a plurality of second inserting portions in corresponding grounding passageways;

wherein the first inserting portions are made from insulating material, the second inserting portions are made from insulating material and embedded with a conductive part, and the conductive part contacts corresponding grounding terminals.

18. The electrical connector as claimed in claim 17, wherein the first and second inserting portions are flush with each other at top ends thereof.

19. The electrical connector as claimed in claim 18, wherein the conductive parts of all the second inserting portions are electrically connect with each other.

20. The electrical connector as claimed in claim 18, wherein the conductive parts are made from conductive plastic.

* * * * *